United States Patent
McMahon et al.

[11] Patent Number: 5,868,378
[45] Date of Patent: Feb. 9, 1999

[54] THROTTLING CONTROL IN A FLUID CONTROL VALVE

[75] Inventors: Timothy A. McMahon; Charles R. Kuhlman; Larry J. Weber, all of Marshalltown, Iowa

[73] Assignee: Fisher Controls International, Inc., Clayton, Mo.

[21] Appl. No.: 789,849

[22] Filed: Jan. 28, 1997

[51] Int. Cl.[6] .................................................. F16K 5/06
[52] U.S. Cl. ................................ 251/315.13; 251/315.08
[58] Field of Search ........................... 251/315.08, 315.13

[56] References Cited

U.S. PATENT DOCUMENTS

| | | |
|---|---|---|
| 2,963,260 | 12/1960 | Siravo . |
| 3,184,213 | 5/1965 | Anderson . |
| 3,195,560 | 7/1965 | Pofit . |
| 3,252,684 | 5/1966 | Ksieski .......................... 251/315.13 X |
| 3,599,933 | 8/1971 | Piccardo . |
| 3,737,145 | 6/1973 | Heller et al. ................... 251/315.13 X |
| 3,841,601 | 10/1974 | Grove et al. . |
| 4,337,919 | 7/1982 | Riepert .......................... 251/315.13 X |
| 4,428,561 | 1/1984 | Thompson ...................... 251/315.13 X |
| 4,519,412 | 5/1985 | Grazioli . |
| 4,566,482 | 1/1986 | Stunkard . |
| 4,566,672 | 1/1986 | Giebeler . |
| 5,016,349 | 5/1991 | Kivipelto . |
| 5,277,404 | 1/1994 | Andersson . |
| 5,482,249 | 1/1996 | Schafbuch et al. . |

OTHER PUBLICATIONS

TK Ball Valves Brochure (8 pages).

*Primary Examiner*—John Fox
*Attorney, Agent, or Firm*—Marshall, O'Toole, Gerstein, Murray & Borun

[57] ABSTRACT

A three-piece fluid control valve configuration including a valve body, a ball control member and two tailpieces that connect the valve to a pipeline and also house the ball fluid seals. Respective bearing plates with trunnion bearings are guide pin mounted between the respective tailpieces and in supporting engagement with respective trunnions on the ball control member for rotatably supporting the ball. A shaft bearing supports a valve shaft having a splined drive end engaging splines in one of the ball trunnions. Bidirectional fluid flow is enabled with ball sealing members on each ball side, with the sealing member on each side replaceable by removing the tailpiece on that side.

2 Claims, 1 Drawing Sheet

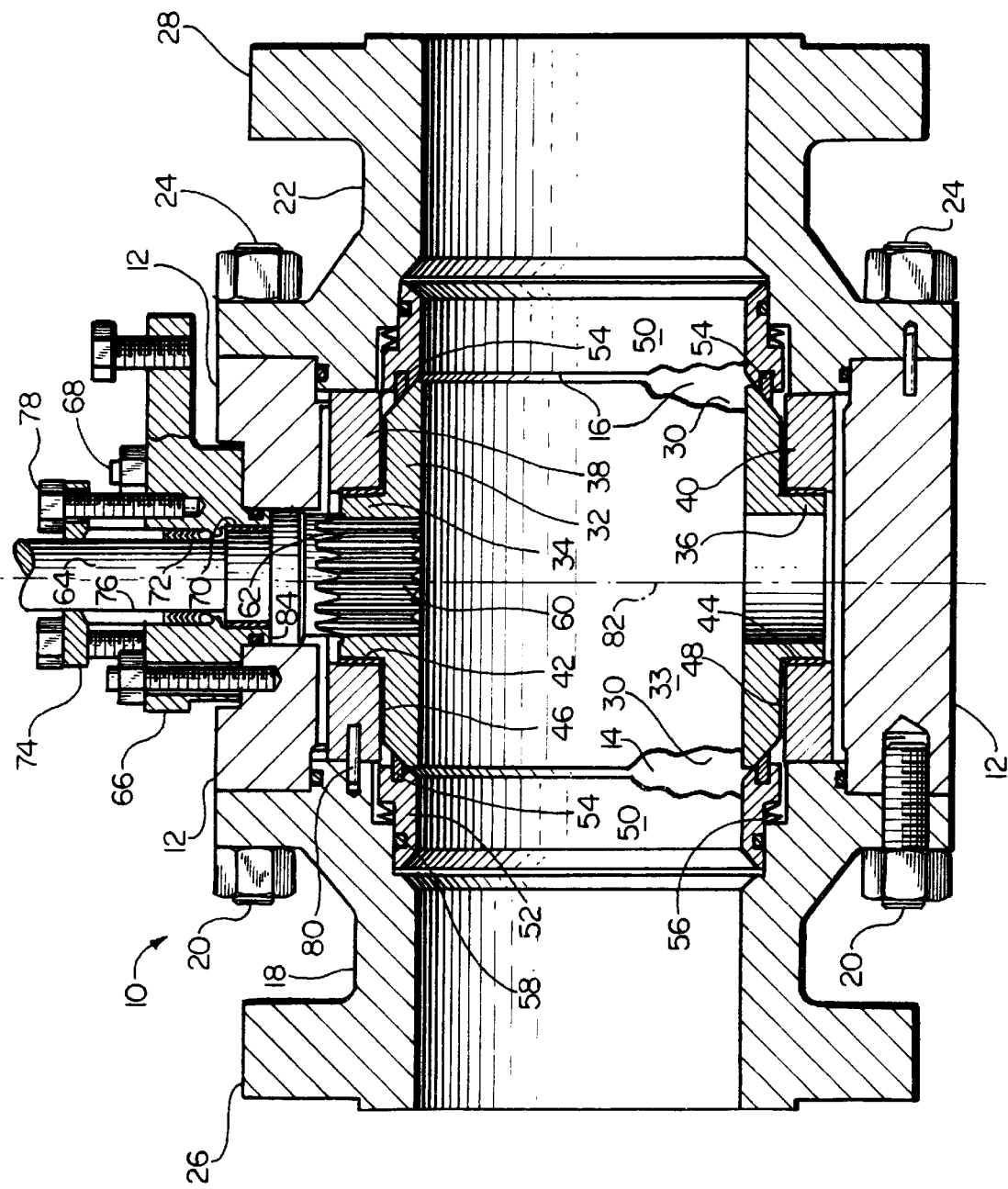

THROTTLING CONTROL IN A FLUID CONTROL VALVE

This invention relates to fluid control valves and in particular to a fluid control valve providing superior throttling control of a flowing fluid with improved fluid sealing performance, seal life, and ease of service.

BACKGROUND OF THE INVENTION

Fluid control valves are often utilized for the on/off control of the flow of fluid or for precisely controlling or throttling the amount of fluid, such as in a gas or oil pipeline system in response to valve controllers and actuators. The precise control of fluid is desired in such systems in order to control the delivery of a precise amount of fluid, or in order to conserve the application and use of fluid additives which may be extremely dangerous or highly expensive. The control valve also must provide a reliable sealing shut-off of the fluid flow when the valve is placed in the shut-off position to prevent the undesired loss of fluid through leakage.

Presently available fluid flow control valves are rotary action control valves with a rotating ball control member mounted in a valve body passageway and are operated by a valve actuator such as a pneumatic piston or diaphragm actuator responding to the output of a valve positioner for throttling control of the valve and thereby to provide desirable accurate throttling control of the fluid flow stream. The rotating ball control member is mounted in a valve body passageway and suitable fluid sealing members are provided between the ball and the valve body.

In such present fluid control valves there is a certain amount of inherent lost motion between controlling movement of the valve operating member in responding to the valve positioner and the actual rotational movement of the ball control member. This lost movement leads to a diminished accuracy of throttling control. In some instances a tight connection is provided between the valve operating member and the ball control member in an attempt to reduce the lost motion between the ball and the operating member. However, in such valves the hydrostatic pressure exerted on the valve shaft tends to move the ball control member away from a reliable sealing position in the valve body passageway which inevitably leads to increased wearing of the fluid seals and reduced seal life.

Another problem in presently available fluid control valves is the inability to readily replace the seal members during normal valve maintenance operations. Typically, present throttling control valves must be substantially disassembled in order to replace the seal members which leads to increased maintenance expenses and increased downtime in the pipeline system.

Accordingly, it is desired to provide a fluid control valve having superior throttling control, which is unaffected by hydrostatic pressure on the valve shaft to increase fluid seal reliability, and wherein the fluid seals can be readily replaced with a minimum of valve component removal.

SUMMARY OF THE INVENTION

In accordance with the principles of the present invention, there is provided a three-piece ball valve configuration including a valve body that contains a ball control member and two tailpieces that connect the valve to a pipeline and also house the ball fluid seals. Respective bearing plates are mounted between the respective tailpieces and in supporting engagement with the rotatable ball control member for rotatably mounting the ball in the valve body.

In one embodiment of the invention a full ball with a bore for passing fluid is utilized. Also, fluid seals are provided on both sides of the full ball and the throttling control valve is bidirectional, i.e., the valve can accommodate a fluid flow in either direction through the valve. If desired a fluid control valve in accordance with the invention can utilize only one fluid seal for a unidirectional flow. The single fluid seal may be on the upstream side or the downstream side.

A spline ball to shaft connection is provided to provide a tight driving connection between the valve shaft operating member and the rotatable ball control member. The spline connection minimizes rotational lost motion between the valve shaft and the ball. The ball is provided with two trunnions protruding from the ball sphere with each trunnion extending into a respective bearing plate. A respective trunnion bearing is provided at the ball top and bottom and is located in the bearing plates so that the ball is supported at the trunnions by the bearings.

The valve shaft operating member may also be supported by a shaft bearing in the packing box housing immediately above the ball control member. The spline ball to shaft driving connection and the dual bearing mounting configuration on the power or drive end of the valve combine to minimize rotational lost motion and yet enable axial movement of the ball, i.e. ball movement along the centerline of the shaft. This combination enables the ball to float axially, independent of the valve shaft while maintaining a rotationally tight ball to shaft connection. Because of the allowance of axial movement between the shaft and the ball, the ball position is unaffected by the hydrostatic pressure exerted on the shaft and enables the ball to self-center or float between the bearing plates.

The present invention provides a fluid control valve with improved throttling capabilities and which enables the valve to respond to smaller dynamic system changes. Also, because the ball is able to float, this provides improved seal performance and seal life. Furthermore, replacement of a seal may be readily made by removing one of the tailpieces from the valve body at one valve end to thereby expose and enable the seal to be readily replaced while the remaining valve components are still assembled.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 1 is a sectional view of a fluid control valve in accordance with the principles of the present invention.

DETAILED DESCRIPTION

Referring now to the drawing FIG. 1, there is illustrated a fluid control valve 10 having a circular-shaped valve body 12 with a fluid body inlet port 14 at one end of the valve body and a fluid body outlet 16 at the opposite end of the valve body. As illustrated in FIG. 1, the fluid control valve 10 is a bidirectional valve with the flow direction being such that port 14 may be considered an inlet or an outlet port with the same respective situation with regard to port 16.

A tailpiece 18 is mounted with suitable stud bolts 20 to one end of the valve body 12. A similar tailpiece 22 is provided for mounting with suitable corresponding stud bolts 24 to the other end of the valve body. The tailpieces 18, 22 include standard pipeline mounting flanges 26, 28 for mounting the control valve 10 to a pipeline carrying fluid.

The valve body 12 also includes a fluid passageway 30 for communicating fluid between fluid ports 14, 16. Within the valve body passageway 30 there is provided a rotatable full ball control member 32 having a flow bore 33. The ball 32 includes respective trunnions 34, 36 projecting from the ball sphere. Each ball trunnion 34, 36 extends into a respective bearing plate 38, 40 at opposite ends of the ball for supporting the ball within the valve body. The bearing plate 38, 40 each has a central aperture adapted to the trunnions 34, 36 and sized to accommodate respective trunnion bearings 42, 44 between the respective trunnion outer perimeter and the bearing plate. Respective ball thrust washers 46, 48 are included between the ball 32 and each respective bearing plate 38, 40.

On each opposite side of the ball 32, there is provided a respective fluid seal assembly 50 which includes a circular-shaped housing 52 nested into a respective tailpiece member. One end of each housing 52 includes a fluid ring seal 54 held within a housing groove for sealably engaging a seal surface on the ball 32. A ring-shaped wave spring 56 is captured between the housing 52 and a respective tailpiece member for resiliently urging the seal assembly 50 towards the ball so as to provide reliable sealing engagement between the fluid ring seal 54 and the ball sealing surface on each side of the ball. In the position shown in FIG. 1, the ball 32 is in the fully opened position permitting fluid flow through the valve via for instance inlet port 14, bore 33, and outlet port 16. When the ball is rotated 90° the valve will be in the fully closed position with the fluid flow to the valve being completely blocked by the ball and by the seals 54 preventing the fluid from undesirably going around the ball and to the valve passageway. An O-ring seal 58 may be provided to provide a fluid seal between the seal assembly 52 and the respective tailpiece member.

As can be seen from FIG. 1, the top ball trunnion 34 includes a series of interior splines 60 for contact engagement with a corresponding splined end 62 of a valve shaft 64. The valve operating member or valve shaft 64 is maintained in position by a packing box housing 66 which is mounted by suitable threaded fasteners 68 to the valve body 12. A shaft bearing 70 in the packing box housing 66 is provided to support the valve shaft 64. Within a suitable packing box defined between the packing box housing 66 and the valve shaft 64 there is provided a standard packing set 72 for fluidly sealing the valve shaft 64. Loading of the packing set 72 is provided by a packing flange 74 in contact engagement with a packing follower 76. Increased packing loading is enabled by threadable engagement of suitable packing studs 78 threadably engaged into the packing box housing 66.

At least four guide pins 80 are provided in corresponding grooves in each of the bearing plates 38, 40 and the respective tailpieces 18, 22. In a constructed embodiment of the fluid control valve 10 in accordance with the present invention, it is found that two guide pins 80 in each of the bearing plates and on each side of the shaft longitudinal axis 82 (i.e., four guide pins per bearing plate) are sufficient to fix the position of the bearing plates. Similar guide pins may be provided between the valve body 12 and the respective tailpiece members 18, 22.

As can be seen from FIG. 1, there is a very tight driving connection provided between the valve shaft spline end 62 and the splines 60 of the ball control member. This spline connection minimizes rotational lost motion between the ball 32 and the shaft 64, thus affording better throttling control of a fluid system. This improved throttling control enables the fluid control valve 10 to respond to smaller dynamic system changes. This reduced rotational lost motion is further minimized by providing a dual bearing configuration on the power or shaft drive end of the ball 32, such as provided by the trunnion bearing 42 and the shaft bearing 70. Also, the ball trunnion bearing 44 combined with the dual bearings provided on the shaft drive end of the valve provides sufficient support to the ball 32 to maintain a rotationally tight connection between the ball and the shaft 64 while also allowing for axial movement along longitudinal shaft axis 82. This combination allows the ball 32 to float axially, independent of the shaft 64 while maintaining a rotationally tight ball to shaft driving connection. Thus, the position of the ball 32 is unaffected by the hydrostatic pressure exerted on the shaft 64 and thus enables the ball 32 to be self-centered in the fluid seals 54.

The unique construction of the flow control valve 10 further permits the ready replacement of the fluid seals 54 as can be seen from the following description of the assembly procedure of the valve components. Initially, one of the tailpieces, such as tailpiece member 18 is mounted on the valve body 12 using the threaded studs 20 at one end of the valve body. Next, the seal assembly 50 at that end is nested into the tailpiece member 18. The guide pins 80, two for the bearing plate 38 and two for the bearing plate 40, are next inserted into suitable holes provided in the tailpiece member 18. The ball 32 with the bearing plates 38, 40 and respective trunnion bearings and thrust washers is then inserted into the valve body passageway 30 with the guide pin holes on the respective bearing plates 38, 40 engaging and being guided by the guide pins 80 on the tailpiece 18 until the bearing plates butt up against the tailpiece member 18. Next, the seal assembly 50 associated with the tailpiece member 22 is nested within the tailpiece member and the four respective guide pins may be easily inserted into the holes of the bearing plates 38, 40 or within the holes provided in the tailpiece member 22 so that when the tailpiece member 22 is assembled against the bearing plates the assembly procedure will be guided by the guide pins. The tailpiece member 22 is then secured in position by the respective threaded studs 24.

Next the shaft 64 with the shaft bearing 70 and if desired a shaft thrust washer 84 is inserted into the valve body with the shaft splined end 62 engaging the splines 60 in the trunnion 34 of the ball 32. Mounting of the packing box housing 66 and the packing set 72 as maintained by the packing follower 76 and the packing flange 74 is provided in the usual normal manner.

It is important to recognize from this assembly procedure that inspection of the seals and replacement of the seals if desired is readily accomplished in the fluid control valve 10. For instance, removing threaded studs 20 enables the tailpiece 18 to be removed from the valve body 12 and thus exposing the seal 54 at one valve body end without disrupting the remaining valve components. Note that even with the tailpiece member 18 removed from the valve body 12 the ball 32 is still maintained in position by the bearing plates 38, 40 engaged with the guide pins 80. This same inspection procedure of the seal 54 on the right side of the valve body in an assembled valve can be provided by removing the tailpiece member 22 from the valve body without disturbing the other valve components.

Accordingly, the fluid control valve 10 provides more precise throttling control of the fluid flow with improved seal performance and seal life while also enabling ready maintenance and replacement of the seals with minimum valve disassembly.

The foregoing detailed description has been given for clearness of understanding only, and no unnecessary limitations should be understood therefrom, as modifications will be obvious to those skilled in the art.

We claim:

1. A fluid control valve operable by a valve actuator for precisely controlling by throttling the amount of fluid flowing in a pipeline comprising:

a valve body having a fluid inlet port and a fluid outlet port at opposite ends of the valve body, and a passageway for communicating fluid therebetween;

respective tailpiece members mounted to the opposite ends of the valve body for mounting the valve to the pipeline, the respective tailpiece members communicating fluid flowing from the pipeline to the fluid inlet port and from the fluid outlet port to the pipeline;

a rotatable ball closure member mounted in the valve body for accurately controlling the amount of fluid flow through the passageway;

opposite bearing plates mounted between the respective tailpieces and in supporting engagement with respective opposite portions of the rotatable ball closure member for rotatably mounting the ball closure member in the valve body;

respective bearings in each of the bearing plates between the ball closure member and the respective bearing plate;

a splined portion of the rotatable ball closure member at one of the respective opposite portions of the rotatable ball closure member;

a valve operating member having a longitudinal axis and a splined end and operatively mounted to the valve body with the splined end engaging the ball closure member splined portion in a spline connection for rotatably operating the ball closure member;

a rotary shaft bearing mounted between the valve operating member and the valve body for radially and rotationally supporting the valve operating member within the valve body;

said rotatable ball closure member having a bore for passing fluid through said passageway, the ball closure member including trunnions on opposite ball closure member ends mountingly engageable in the respective bearings providing opposite ball trunnion bearings rotationally supporting said ball closure member within the valve body;

said respective ball trunnion bearing at one ball closure member end and said respective ball trunnion bearing and rotary shaft bearing at the opposite ball closure member end, and said spline connection providing a rotationally tight connection between the ball closure member and the valve operating member and within the valve body to minimize rotational lost motion while also enabling slight floating movement of said ball closure member along the valve operating member longitudinal axis;

respective fluid seal members mounted between at least one of the tailpiece members and the ball closure member for fluid sealing one end of the valve body passageway and the ball closure member; and wherein each tailpiece member is removably mounted to a respective opposite end of the valve body for replacing the respective fluid seal member at that end without removing any other valve components.

2. A fluid control valve according to claim 1, including guide pins associated with each of the respective tailpiece members for guidable mounting of each respective tailpiece member to the bearing plates wherein the guide pine maintain the ball closure member in position when a respective tailpiece member is removed from the valve.

\* \* \* \* \*

UNITED STATES PATENT AND TRADEMARK OFFICE
CERTIFICATE OF CORRECTION

PATENT NO. : 5,868,378
DATED : February 9, 1999
INVENTOR(S) : TIMOTHY A. McMAHON, ET AL.

It is certified that error appears in the above-identified patent and that said Letters Patent is hereby corrected as shown below:

Col. 6, Claim 2, line 34,   change "pine" to --pins--.

Signed and Sealed this

Nineteenth Day of October, 1999

Attest:

Q. TODD DICKINSON

Attesting Officer    Acting Commissioner of Patents and Trademarks